April 6, 1937.    S. S. STOLP ET AL    2,076,101
TROLLEY CONTACTOR
Filed Dec. 1, 1933
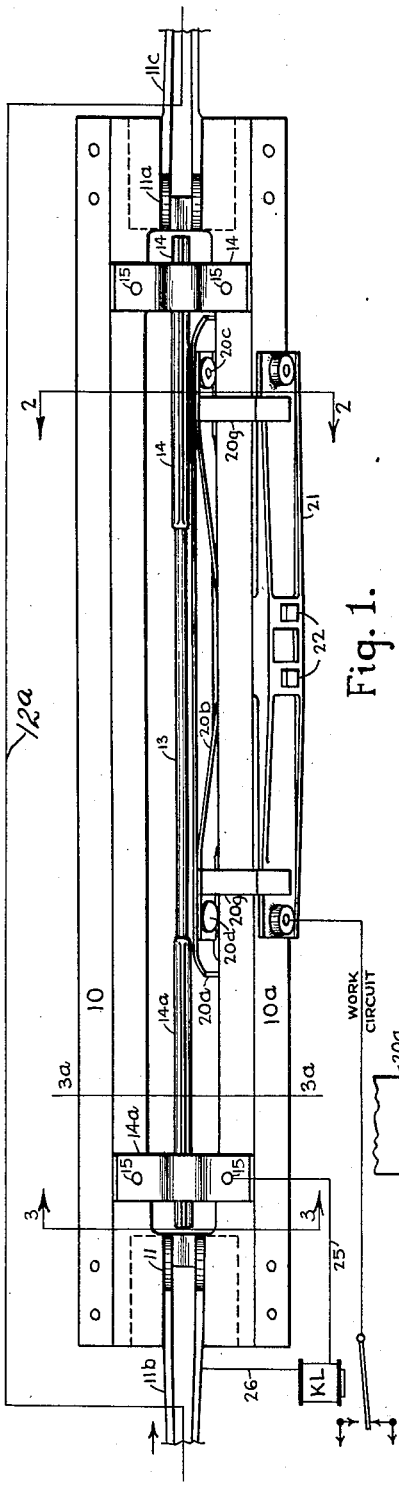
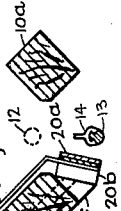
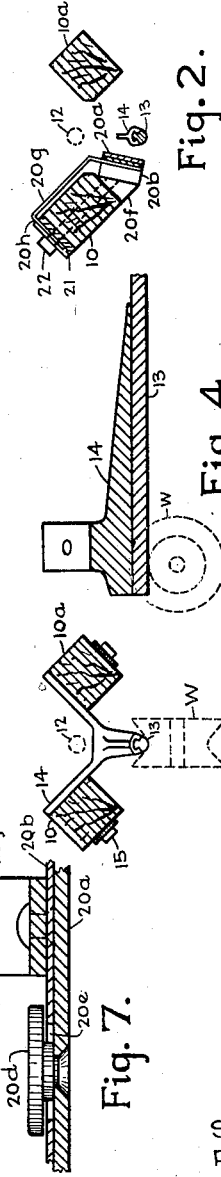
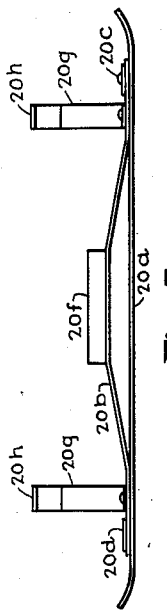
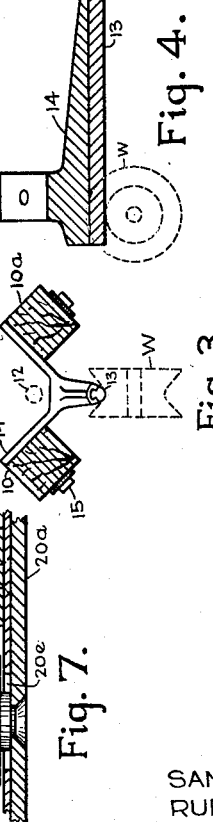
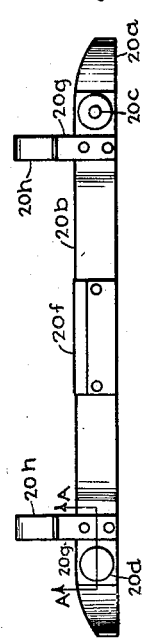
Inventors
SAMUEL S. STOLP
RUFUS C. SUTTON
By John L. Milton.
Attorney Patented Apr. 6, 1937

2,076,101

UNITED STATES PATENT OFFICE 2,076,101

TROLLEY CONTACTOR

Samuel S. Stolp, Louisville, Ky., and Rufus C. Sutton, Pittsburgh, Pa., assignors to Cheatham Electric Switching Device Co., Incorporated, Louisville, Ky., a corporation of Kentucky Application December 1, 1933, Serial No. 700,418

17 Claims. (Cl. 246—254)

Our invention relates to trolley wire contactors of the type that is constructed with sections of insulation on which are attached contact members to be engaged by a passing trolley wheel or shoe, carried on the trolley pole of an electrically operated street car, which in the street railway industry is usually termed, "trolley pans".

The main object of this invention is to provide an improved type of structure, the fundamental principles of which were disclosed in United States Patent No. 1,786,449, issued to G. D. Rabun.

To the obtainment of these ends and the accomplishment of the new and useful objects hereinafter appearing, our invention consists in the features of novelty disclosed in the construction, combination, and arrangement of the parts described in the following specification, and shown in the accompanying drawing, illustrating the embodiment and wherein;

In the drawing:

Figure 1 is a plan view of the contactor in its entirety.

Fig. 2 is a cross sectional view of Fig. 1 along the line 2, 2 with the parts falling in the background omitted and with the position of the trolley wire to the contactor at this plane indicated by a dotted line, it being understood that the trolley wire is not shown in Fig. 1.

Fig. 3 is a cross sectional view of Fig. 1 at the line 3, 3 in the direction of the arrows as far as line 3a, 3a, the relative position of the trolley wire again being indicated by a dotted line. This figure also shows the relation of a trolley wheel to the trolley pan.

Fig. 4 is a cross sectional view of the metallic bracket central member of Fig. 3, together with a portion of the central contact wire with which trolley wheels contact in passing through the trolley pan.

Fig. 5 is a detailed plan view of the wheel resilient contact member assembly shown assembled in Fig. 1.

Fig. 6 is an elevational view of Fig. 5.

Fig. 7 is an enlarged cross sectional view of Fig. 6 along a section adjacent the end indicated by the line A, A.

Numerals 10, 10a indicate insulating beam members composed of wood or other suitable material and are secured in fixed relation by means of brackets 11, 11a of the type disclosed in United States Patent to Kempton, No. 1,166,912, without a cam tip, this being the medium for attaching this trolley pan to the trolley wire, the details of which are familiar to every one versed in the kindred arts. The trolley wire is looped or passed over the top of the trolley pan as indicated by dotted line 12, 12 and is graphically indicated by line 12a.

Centrally disposed of the trolley pan is a section of heavy standard trolley wire 13, the ends of which are rigidly held by saddles 14, 14a, which are in turn fixed to beams 10, 10a, by bolts 15 and form a sub-assembly unit. The saddles are fashioned and located in order that the lower surface of wire 13 will be substantially in line with the lower surface of arms 11b, 11c, which are illustrated, Fig. 1, in open form to receive the trolley wire and then closed thereon. It is understood that each associated arm is an integral part of brackets 11, 11a, in order that the trolley wheel will have a substantially smooth uninterrupted contact or under-run with the trolley pan when making its travel through this device. Facing and in insulated fixed relation to wire 13, contactor strip 20a of resilient material, such as bronze, effects contact with the flange of wheel W, while passing. Strip 20a is rigidly attached to strip spring 20b, by rivet 20c, and slidably attached at the other end by shouldered rivet 20d, as shown in Fig. 7, there being a clearance, which is shown by 20e, to allow free movement of 20a with reference to 20b, the latter being secure to beam 10a by bolts 22, 22, which also secure bar 21 of electrical conducting material.

As shown in Figs. 1 and 2, strip 20a is angularly disposed to the vertical in order that the engagement of the flange with this strip will be effected without shock. Arms 20g are fixed on to 20b and they are further provided with arms 20h disposed for engagement under spring pressure with bar 21, the whole being so corelated that strip 20a is held under pressure of spring 20b in definite relation for its entire length to wire 13. This arrangement has been adopted to provide definite and ready means for establishing these relations during manufacture and maintaining same during use.

The structure of the flexible contactor shown by Fig. 5, its location to wire 13 and the placing of the leaving end of the strip 20a in relation to the leaving end of 13, together with its location in terms of the entering end of the insulated central section 13 and the means of attaching it to beam 10a, also the use of the through bolts employed not only to hold the complete resilient contactor assembly at the selected place, but to secure bar 21 was all the result of a long period of development and experimentation in service. The problem of supporting and limiting the movement of extreme ends of the complete resilient contactor assembly and still maintaining the high degree of insulation necessary for long life in service where a 600 volt heavy ampere current is being handled while exposed to the elements, was a problem by itself where ordinary expedients or adaptations were of little or no avail. Surface leakage, even though adequate insulation may be apparent, has been an ever threatening enemy to dependable operation of trolley pans. To provide a flexible definite contact member and at the same time protect it from the havoc wrought by flying trolleys was another problem. The apparent difference of degree in design, spacings, et cetera incorporated into this contactor in terms of former contactors belonging to the same general class cannot be dismissed as such, as it has resulted in a difference of kind, one that is robust, without excessive weight and competent to withstand exacting severe usage incident to the class of service to which this trolley pan is destined to encounter in any electric railway service.

It will be perceived that as a trolley wheel engages strip 20a regardless of direction, a pressure contact results. These means are employed to cause current to flow from trolley voltage into a work circuit disposed between the ground, bar 21, bolts 22, resilient contactor 20a, 20b, the trolley wheel, which is now carrying substantially trolley voltage by reason of wire 13 being connected to the trolley wire through KL selector circuit leading from saddle 14a to bracket 11a via wire 25, solenoid KL and wire 26, as is well understood in the switch point throwing art. It should be noted that saddles 11, 11a are electrically connected by trolley wire 12a.

The relation of the parts shown in Fig. 1 is for operation in the direction of the adjacent arrow, the trolley wheel after passing from the trolley wire to contact with bracket 10a will engage wire 13 with or without power. In the former instance, the heavy car motor current will cause KL to pick up for one selection and in the case without power, the KL will not be effected as it is provided with a heavy winding of a few turns in order that it will not move the armature. This method is frequently referred to as "power on" and "power off" operation.

The above disclosure will suggest modifications and variations to others versed in the art therefore I wish to be limited only by the attached claims.

We claim:

1. In a trolley pan comprising a longitudinal beam of insulating material a resilient member secured to said beam and a contact strip slidably attached to said resilient member.

2. In a trolley pan comprising a longitudinal beam of insulating material a resilient member secured to said beam and a contact strip slidably attached to said resilient member, said strip being equipped with means to cooperate with the beam to determine the rest position of said strip.

3. In a trolley pan comprising a longitudinal beam of insulating material a resilient member rigidly secured to said beam and a contact strip slidably attached to said resilient member, said strip being equipped with an arm at each end to cooperate with the beam to determine the rest position of said strip.

4. In a trolley pan provided with a pair of parallel beams of insulating material and an insulated rigid electrical contactor member embraced by two other linearly placed rigid contactor members, said members being fashioned for engagement with the groove of a collector and linearly located between said beams, and a resilient contactor member supported on one of said beams and positioned so that the surface of said resilient contactor member will be engaged by the current collector as it is guided through the pan by the first mentioned rigid contactor member.

5. In a trolley pan provided with a pair of parallel beams of insulating material and an insulated rigid electrical contactor member embraced by two other linearly placed rigid contactor members, said members being fashioned for engagement with the groove of a collector and linearly located between said beams, and a resilient contactor member resiliently supported on one of said beams and positioned so that the surface of said resilient contactor member will be engaged by the current collector as it is guided through the pan by the first mentioned rigid contactor member.

6. In a trolley pan provided with a pair of longitudinally extending connected beams of insulating material and an insulated rigid electrical contactor member embraced by two other linearly placed rigid contactor members which are electrically connected, said members being fashioned for engagement with the groove of a collector and linearly located on said beams, said pan being equipped with a resilient linear contactor member supported from one of said beams and positioned so that the surface of said resilient contactor member will be engaged by the current collector as it is guided through the pan by the first mentioned rigid contactor member.

7. In a trolley pan provided with a pair of longitudinally extending connected beams of insulating material and an insulated rigid electrical contactor member embraced by two other linearly placed rigid contactor members which are electrically connected, said members being fashioned for engagement with the groove of a collector and linearly located on said beams, said pan being equipped with a resilient linear contactor member resiliently supported from one of said beams and positioned so that the surface of said resilient contactor member will be engaged by the current collector as it is guided through the pan by the first mentioned rigid contactor member.

8. In a trolley pan provided with a pair of longitudinally extending connected beams of insulating material and an insulated rigid electrical contactor member embraced by two other linearly placed rigid contactor members, said member being fashioned for engagement with the groove of a collector and longitudinally disposed on said beams, said pan being equipped with a resilient contactor supported on one of said beams and positioned so that the surface of said resilient contactor will be engaged by the current collector as it is guided through the pan by the first mentioned rigid contactor member.

9. In combination, a trolley wire and a trolley pan mounted thereon, said pan being provided with a pair of longitudinally extending connected beams of insulating material, a rigid electrical contactor member mechanically independent of said wire, said member being rigidly attached to said beams and fashioned for engagement with the groove of a collector and positioned to guide said collector through the pan, said pan being equipped with a resilient contactor member located between said beams and supported from one of said beams, said resilient member being positioned to be engaged by the current collector as it is guided through the pan by the first mentioned contactor member.

10. In a trolley pan organized for attachment to a trolley wire and provided with a pair of longitudinally extending connected beams of insulating material, a rigid linear electrical contactor member having its ends attached to said beams, independently of said trolley wire and fashioned for engagement with the groove of a collector, said contactor being longitudinally located between said beams, said pan being equipped with a resilient contactor member located between said beams and supported from one of said beams, said resilient member being positioned to be engaged by the current collector as it is guided through the pan by the rigid contactor member.

11. In a trolley pan organized for attachment to a trolley wire and provided with a pair of longitudinally extending connected beams of insulating material, a rigid linear electrical contactor member having its ends attached to said beams, independently of said trolley wire and fashioned for engagement with the groove of a collector, said contactor being centrally located between said beams, said pan being equipped with a resilient contactor member also located between said beams and supported from one of said beams, said resilient member being positioned to be engaged by the current collector as it is guided through the pan by the rigid contactor member.

12. In combination, a trolley wire and a trolley pan mounted thereon, said pan being provided with a pair of longitudinally extending connected beams of insulating material, a rigid electrical contactor member rigidly attached to said beams independently of said wire and fashioned for engagement with the groove of a collector and positioned to guide said collector through said pan, said pan being equipped with a resilient contactor member located between said beams and supported from one of said beams, said resilient member being positioned to be engaged by the current collector as it is guided through the pan by the rigid contactor member.

13. In a trolley pan organized for attachment to a trolley wire and provided with a pair of longitudinally extending connected beams of insulating material, a rigid linear electrical contactor member having its ends attached to said beams, independently of said trolley wire and fashioned for engagement with the groove of a collector, said pan being equipped with a resilient contactor member located between said beams and supported from one of said beams, said resilient member being positioned to be engaged by the current collector subsequent to engagement with the rigid contactor member and disengaged therefrom while contact is maintained between the collector and said rigid contactor member as the collector is guided through the pan by the rigid contactor member.

14. In a trolley pan organized for attachment to a trolley wire and provided with a pair of longitudinally extending connected beams of insulating material, a rigid linear electrical contactor member having its ends attached to said beams, independently of said trolley wire and fashioned for engagement with the groove of a collector and centrally located between said beams, said contactor being independent of the trolley wire, said pan equipped with a resilient contactor member also located between said beams and supported from one of said beams, said resilient member positioned to be engaged by the current collector subsequent to engagement with the rigid contactor member and disengaged therefrom while contact is maintained between the collector and said rigid contactor member as the collector is guided through the pan by the rigid contactor member.

15. In a trolley pan provided with a pair of longitudinally extending connected beams of insulating material and an insulated rigid electrical contactor member embraced by two other linearly placed rigid contactor members, said members being fashioned for engagement with the groove of a collector and linearly located between said beams, said pan being equipped with a resilient linear contactor member resiliently supported from one of said beams and positioned so that the surface of said resilient contactor member will be engaged by the current collector subsequent to engagement with the first mentioned rigid contactor member and disengaged therefrom while contact is maintained between the collector and said first mentioned rigid contactor member, as the collector is guided through said pan by said rigid contactor.

16. In a trolley pan provided with a pair of longitudinally extending connected beams of insulating material and an insulated rigid electrical contactor member embraced by two other linearly placed rigid contactor members which are electrically connected, said members being fashioned for engagement with the groove of a collector and linearly located between said beams, said pan being equipped with a resilient linear contactor member resiliently supported from one of said beams and positioned so that the surface of said resilient contactor member will be engaged by the current collector, subsequent to engagement with the first mentioned rigid contactor member and disengaged therefrom while contact is maintained between the collector and said first mentioned rigid contactor member, as the collector is guided through said pan by said rigid contactor.

17. In a trolley pan provided with a pair of longitudinally extending fixed beams of insulating material and a rigid longitudinally extending electrical contactor member embraced by two other linearly placed rigid bracket members which are electrically connected, all of said members being fashioned for engagement with the groove of a collector and linearly located on said beams, said pan being equipped with a resilient linear contactor member supported on one of said beams and positioned so that the surface of said resilient contactor member will be engaged by the current collector subsequent to engagement with the first mentioned rigid contactor member, as the collector is guided through said pan by said rigid contactor.

SAMUEL S. STOLP.
RUFUS C. SUTTON.